US012368230B2

(12) United States Patent
Lai et al.

(10) Patent No.: US 12,368,230 B2
(45) Date of Patent: Jul. 22, 2025

(54) COMMUNICATION DEVICE AND HEAD-MOUNTED DISPLAY DEVICE

(71) Applicant: PEGATRON CORPORATION, Taipei (TW)

(72) Inventors: Po-Yen Lai, Taipei (TW); Hsiao-Feng Chang, Taipei (TW); Ping-Hung Lu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 252 days.

(21) Appl. No.: 18/296,675

(22) Filed: Apr. 6, 2023

(65) Prior Publication Data

US 2023/0411830 A1 Dec. 21, 2023

(30) Foreign Application Priority Data

Jun. 15, 2022 (TW) ................................ 111122295

(51) Int. Cl.
*H01Q 1/24* (2006.01)
*H01Q 21/28* (2006.01)

(52) U.S. Cl.
CPC ............ *H01Q 1/241* (2013.01); *H01Q 21/28* (2013.01)

(58) Field of Classification Search
USPC ........................................................ 343/700
See application file for complete search history.

(56) References Cited

U.S. PATENT DOCUMENTS

2017/0214121 A1* 7/2017 Ganchrow ........... H01Q 1/2258

FOREIGN PATENT DOCUMENTS

| | | | | | |
|---|---|---|---|---|---|
| CN | 104240788 | A | | 12/2014 | |
| CN | 108352867 | A | * | 7/2018 | G02B 27/0176 |
| CN | 212391568 | U | * | 1/2021 | G01R 31/086 |
| CN | 112731660 | A | | 4/2021 | |
| CN | 114402249 | A | | 4/2022 | |

* cited by examiner

*Primary Examiner* — Dimary S Lopez Cruz
*Assistant Examiner* — Brandon Sean Woods
(74) *Attorney, Agent, or Firm* — MUNCY, GEISSLER, OLDS & LOWE, P.C.

(57) ABSTRACT

The present invention discloses a head-mounted display device and a communication device including a communication circuit, an antenna assembly, and a transfer module. The antenna assembly includes at least one first antenna and a second antenna. The first antenna is electrically connected to the communication circuit, and the second antenna is disposed at a top headband of the head-mounted display device. The transfer module includes a connecting wire assembly, a transfer element, and a transfer wire assembly. The transfer wire assembly is electrically connected to the transfer element and the second antenna. Two ends of the connecting wire assembly are connected to the communication circuit and the transfer element, respectively. The connecting wire assembly includes two radio frequency (RF) signal wires and a power signal wire. A power loss of the two RF signal wires is less than a power loss of the transfer wire assembly.

11 Claims, 5 Drawing Sheets

COMMUNICATION DEVICE AND HEAD-MOUNTED DISPLAY DEVICE

CROSS REFERENCE TO RELATED APPLICATIONS

This application claims the priority benefit of Taiwan applications serial no. 111122295, filed on Jun. 15, 2022. The entirety of the above-mentioned patent application is hereby incorporated by reference herein and made a part of this specification.

BACKGROUND

Technical Field

The present invention relates to a communication device, and in particular, to a communication device including a 5G millimeter wave (mmWave) antenna and a head-mounted display device.

Description of Related Aprt

For the electronic consumer market, people have increasingly high requirement for virtual reality (VR) or augmented reality (AR) products, and the resolution and fluency of a display screen of a head-mounted display device are the index requirements of consumers for a head-mounted display. This type of product has very high requirements for a bandwidth, a time delay, and a frame number, otherwise dizziness and low resolution may be caused during use, which may reduce the attractiveness of the product. The above problems are not easily solved through Wi-Fi or the communication technology in the 4G era. At present, 5G is the only way to achieve wireless, high-frame-rate, and low-latency VR/AR by virtue of its properties such as a large bandwidth, a high transmission rate, and a low latency.

Compared with the antenna field in the frequency band below 6 GHz (Sub-6), the antenna field of the 5G millimeter wave is very directional, which only receives and transmits signals in a certain direction. Therefore, in order to achieve all-round good communication ability, the 5G millimeter-wave communication product are configured with 5G millimeter-wave antenna modules in different orientations of the product system, thereby increasing the communication coverage. In this way, when a user wears the head-mounted display device, the high-efficiency data transmission can be maintained in all orientations of a usage situation, without a problem of poor communication due to a dead zone which is a result of a small signal coverage.

However, the hardware circuit specification of the 5G millimeter wave antenna module requires accurate calculation of a line loss of a radio frequency (RF) signal. Otherwise, if the 5G millimeter wave antenna module is configured in different orientations in order to achieve all-round good communication ability, but the attenuation of the RF signal cannot meet the specification of 5G millimeter wave communication, the problem that effective communication coverage cannot be achieved may be caused.

SUMMARY

An object of the present invention is to provide a communication device and a head-mounted display device including the communication device, which can not only meet the specification of 5G millimeter wave communication loss, but also maintain high-efficiency data transmission in all orientations, so as to avoid the problem of poor communication due to a dead zone which is a result of a small signal coverage.

In order to achieve the above object, the communication device according to the present invention is adapted to be disposed in a head-mounted display device. The head-mounted display device includes a display unit, a casing, and a top headband. The display unit is connected to the casing through the top headband. The communication device includes a communication circuit, an antenna assembly, and a transfer module. The communication circuit is disposed at a casing of the head-mounted display device. The antenna assembly includes at least one first antenna and a second antenna. The at least one first antenna is disposed at the casing and is electrically connected to the communication circuit, and the second antenna is disposed at a top headband of the head-mounted display device. The transfer module includes a connecting wire assembly, a transfer element, and a transfer wire assembly. The transfer wire assembly is electrically connected to the transfer element and the second antenna. One end of the connecting wire assembly is connected to the communication circuit, and the other end of the connecting wire assembly is connected to the transfer element to be electrically connected to the second antenna. The connecting wire assembly includes two RF signal wires and a power signal wire. A power loss per unit length of the two RF signal wires is less than a power loss per unit length of the transfer wire assembly.

In an embodiment, the transfer element includes a power connection portion, two RF connection portions, and a transfer connection portion. The power signal wire is connected to the power connection portion, the two RF signal wires are connected to the two RF connection portions, respectively, and the transfer wire assembly is connected to the transfer connection portion.

In an embodiment, the transfer wire assembly is a flexible circuit board and includes a power transfer line and two RF transfer lines. The power transfer line is electrically connected to the power signal wire through the transfer element, and the two RF transfer lines are electrically connected to the two RF signal wires through the transfer element, respectively.

In an embodiment, the communication device further includes a first heat dissipation element. The first heat dissipation element is disposed at the top headband, and the second antenna and the transfer element are disposed at the first heat dissipation element.

In an embodiment, the communication device further includes a first heat dissipation element. The first heat dissipation element is disposed at the top headband, and the second antenna and the transfer element are disposed at the first heat dissipation element.

In an embodiment, the first heat dissipation element further has a main body parallel to the top headband, and the transfer element is disposed at the main body.

In an embodiment, the first heat dissipation element further has a main body parallel to the top headband, and the transfer element is disposed at the main body.

In order to achieve the above object, the head-mounted display device according to the present invention includes a display unit, a casing, a top headband, and a communication device. The display unit is connected to the casing through the top headband. The communication device includes a communication circuit, an antenna assembly, and a transfer module. The communication circuit is disposed at a casing of the head-mounted display device. The antenna assembly includes at least one first antenna and a second antenna. The at least one first antenna is disposed at the casing and is electrically connected to the communication circuit, and the second antenna is disposed at a top headband of the head-mounted display device. The transfer module includes a connecting wire assembly, a transfer element, and a transfer wire assembly. The transfer wire assembly is electrically connected to the transfer element and the second antenna. One end of the connecting wire assembly is connected to the communication circuit, and the other end of the connecting wire assembly is connected to the transfer element to be electrically connected to the second antenna. The connecting wire assembly includes two RF signal wires and a power signal wire. A power loss per unit length of the two RF signal wires is less than a power loss per unit length of the transfer wire assembly.

In an embodiment, the communication device further includes a first heat dissipation element. The first heat dissipation element is disposed at the top headband, and the second antenna and the transfer element are disposed at the first heat dissipation element.

In an embodiment, the first heat dissipation element has a bent portion facing the display unit, and the second antenna is disposed at the bent portion.

In an embodiment, the antenna assembly includes two first antennas, and the two first antennas are disposed at two opposite sides of the casing, respectively.

In an embodiment, the head-mounted display device further includes a second heat dissipation element disposed in the casing. The communication circuit and the two first antennas are disposed at the second heat dissipation element.

In an embodiment, the second heat dissipation element has two bent portions located on two opposite sides, and each of the first antennas is correspondingly disposed at each of the bent portions.

Carrying on with the above, in the communication device and the head-mounted display device having the communication device of the present invention, through the design that two first antennas are disposed in the casing, the second antenna is disposed at the top headband, one end of the connecting wire assembly is connected to the communication circuit, the other end of the connecting wire assembly is electrically connected to the second antenna through the transfer element and the transfer wire assembly, and the power loss per unit length of the two RF signal wires is less than the power loss per unit length of the transfer wire assembly, the attenuation of the RF signal of the second antenna away from the communication circuit can be reduced to meet the specification of 5G millimeter wave communication loss, and high-efficiency data transmission can be maintained in all orientations, so as to avoid the problem of poor communication due to a dead zone which is a result of a small signal coverage.

BRIEF DESCRIPTION OF THE DRAWING

The disclosure will become more fully understood from the detailed description and accompanying drawings, which are given for illustration only, and thus are not limitative of the present disclosure, and wherein.

DETAILED DESCRIPTION

Figure 1:
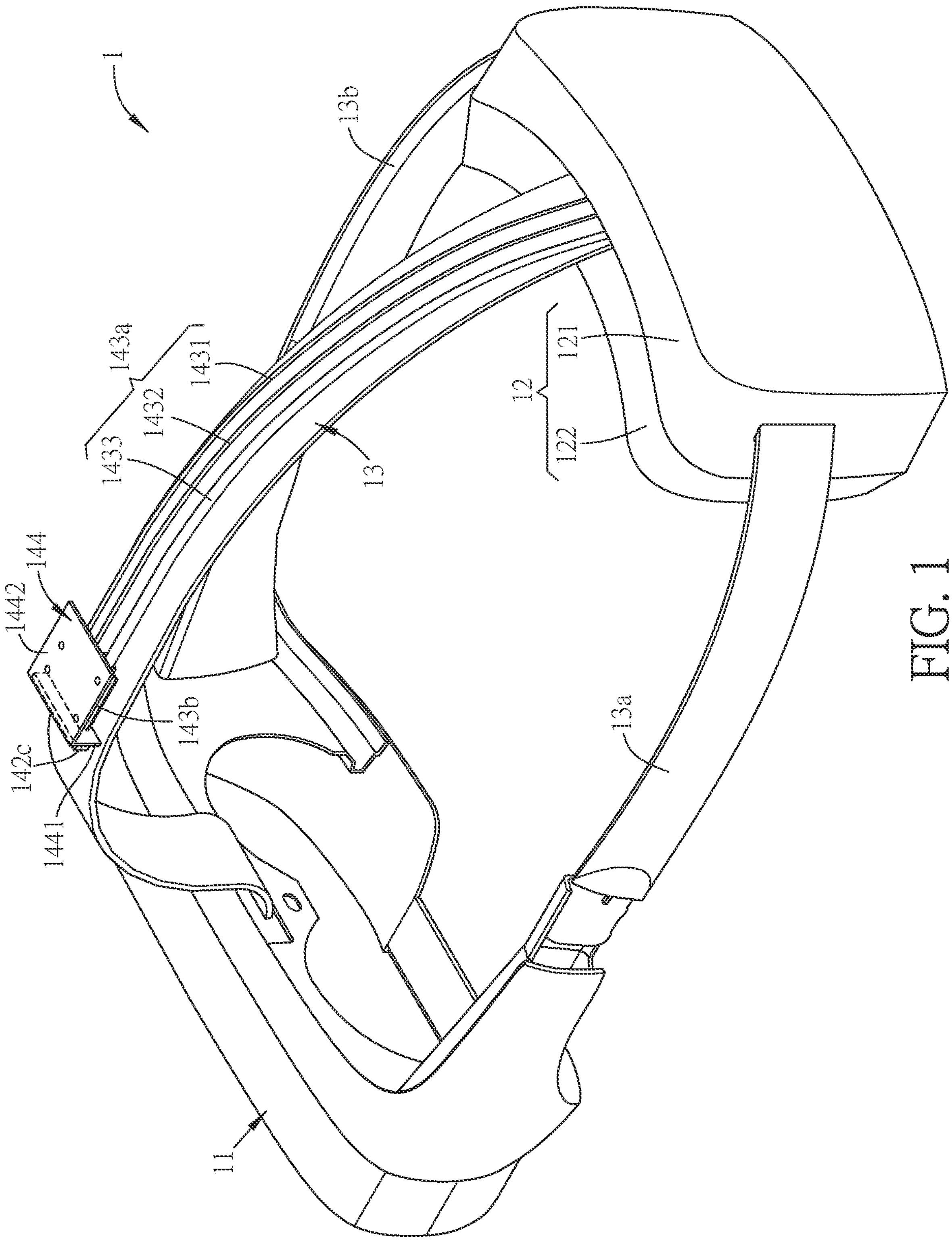
FIG. 1 is a schematic diagram of a head-mounted display device according to an embodiment of the present invention.

To fully understand the objectives, features and functions of the present invention, the present invention is described in detail by using the following specific embodiments with reference to the accompanying drawings. The description is as follows:

A communication device and a head-mounted display device according to some embodiments of the present invention are to be described below with reference to related drawings, where the same elements are described with the same reference numerals.

Figure 2:
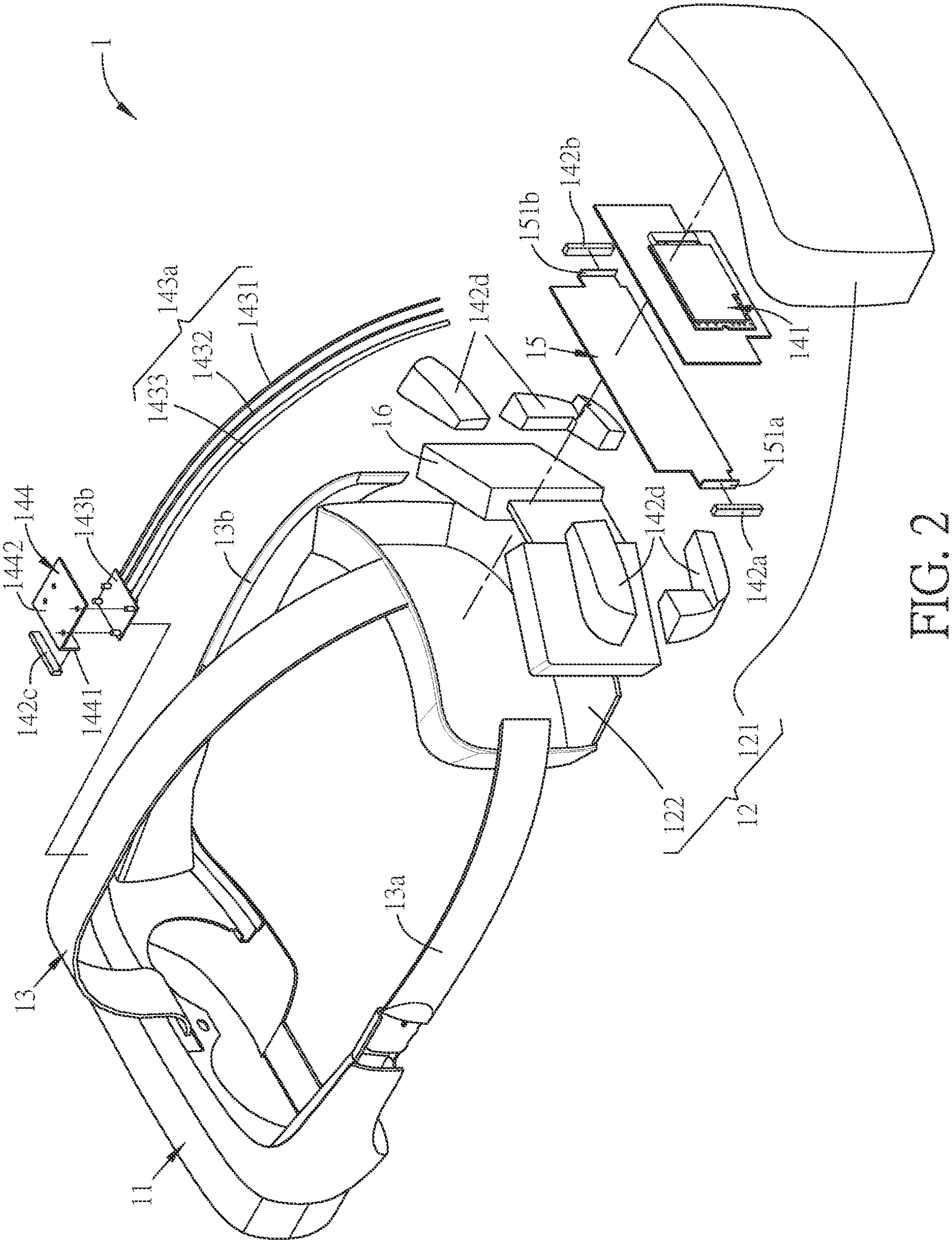
FIG. 2 is a partial schematic exploded view of the head-mounted display device of FIG. 1.
Figure 3:
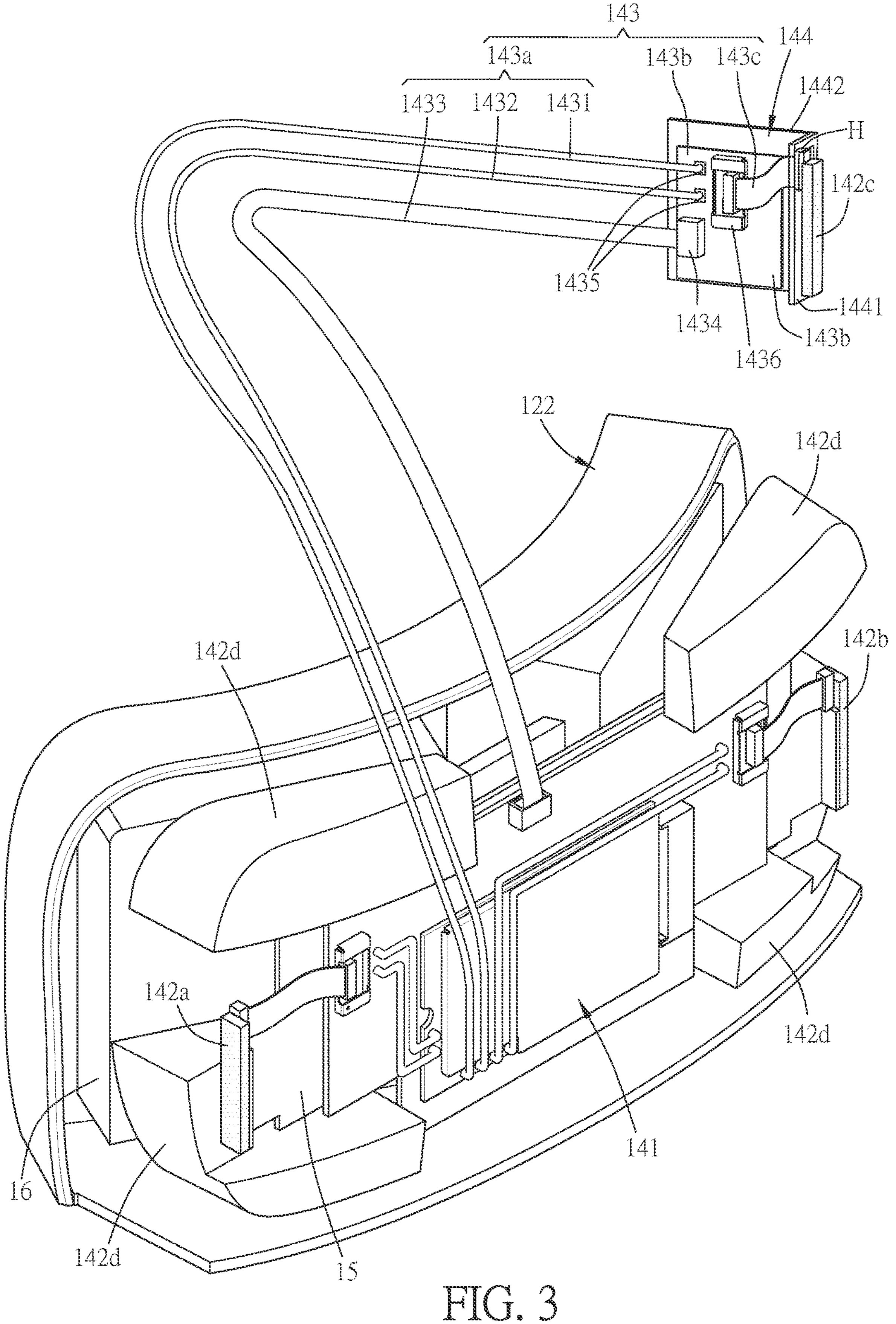
FIG. 3 is a partial schematic diagram of the head-mounted display device of FIG. 1.

FIG. 1 is a schematic diagram of a head-mounted display device according to an embodiment of the present invention. FIG. 2 is a partial schematic exploded view of the head-mounted display device of FIG. 1. FIG. 3 is a partial schematic diagram of the head-mounted display device of FIG. 1.

Referring to FIG. 1 to FIG. 3, the head-mounted display device 1 includes a display unit 11, a casing 12, a top headband 13, and a communication device. The display unit 11 is connected to the casing 12 through the top headband 13. In addition, the display unit 11 of this embodiment may be further connected to the casing 12 through two sidebands 13*a* and 13*b* located on side surfaces. When a user wears the head-mounted display device 1 to play a game such as virtual reality (VR) or augmented reality (AR), the display unit 11 is located in front of eyes of a user, the casing 12 is located behind a head of the user, the top headband 13 is located on a top of the head of the user, and the sidebands 13*a* and 13*b* are located on two sides of the head. Therefore, it is not easy for the user to shake when wearing the head-mounted display device 1 to play the game. In some embodiments, the display unit 11 may include, for example, but not limited to, elements such as a display screen, a main control circuit board, a Wi-Fi RF module circuit, a Wi-Fi antenna, a battery, and the like. The elements are not the focus of the present invention. The designer may find relevant information from the previous patent or public documents, and the details are not described herein.

The casing 12 of this embodiment includes an upper enclosure 121 and a lower enclosure 122, which are connected by, for example, but not limited to, locking or embedding to form an accommodating space. The accommodating space may be used for accommodating parts or components disposed inside the casing 12. Certainly, the connection mode of the upper enclosure 121 and the lower enclosure 122 is not limited.

The communication device includes a communication circuit 141, an antenna assembly, and a transfer module 143. Herein, the communication circuit 141 is disposed at the casing 12. In some embodiments, the communication circuit 141 may include a 5G communication device as an RF module and circuit for 5G communication to support the 5G wireless communication function.

The antenna assembly includes at least one first antenna and a second antenna. The first antenna is disposed at the casing 12 and is electrically connected to the communication circuit 141. The second antenna is disposed at the top headband 13 and is also electrically connected to the communication circuit 141. In this embodiment, for example, the antenna assembly includes two first antennas 142*a* and 142*b* and a second antenna 142*c*, and the first antennas 142*a* and

142*b* and the second antenna 142*c* are all 5G millimeter wave antennas. The first antennas 142*a* and 142*b* are configured in the casing 12, and the second antenna 142*c* is configured on the top headband 13, so that the communication coverage of 5G millimeter wave in a plurality of orientations can be achieved.

The transfer module 143 includes a connecting wire assembly 143*a*, a transfer element 143*b*, and a transfer wire assembly 143*c* (FIG. 3). The transfer element 143*b* of this embodiment is a small-sized circuit board by way of example. The transfer element 143*b* may integrate signals of the connecting wire assembly 143*a* and transfer the signals to an interface of the second antenna 142*c* through the transfer wire assembly 143*c*. Two opposite ends of the transfer wire assembly 143*c* are electrically connected to the transfer element 143*b* and the second antenna 142*c*, respectively. One end of the connecting wire assembly 143*a* is connected to the communication circuit 141, and the other end of the connecting wire assembly 143*a* is connected to the transfer element 143*b* to be electrically connected to the second antenna 142*c* through the transfer wire assembly 143*c*. Herein, the connecting wire assembly 143*a* includes at least two RF signal wires 1431 and 1432 and a power signal wire 1433. A power loss per unit length of the at least two RF signal wires 1431 and 1432 is less than a power loss per unit length of the transfer wire assembly 143*c*, and a length of each of the RF signal wires 1431 and 1432 is greater than a length of the transfer wire assembly 143*c*.

The connecting wire assembly 143*a* of this embodiment includes two RF signal wires 1431 and 1432 and a power signal wire 1433 by way of example. The RF signal wires 1431 and 1432 are configured to transmit RF signals, and two ends of the RF signal wires are connected to the communication circuit 141 and the transfer element 143*b*, respectively. The power signal wire 1433 is configured to transmit power, and two ends of the power signal wire are connected to the communication circuit 141 and the transfer element 143*b*, respectively. The transfer element 143*b* is electrically connected to the second antenna 142*c* through the transfer wire assembly 143*c*. Therefore, the communication circuit 141 may transmit an RF signal to the second antenna 142*c* through the RF signal wires 1431 and 1432, the transfer element 143*b*, and the transfer wire assembly 143*c*. Alternatively, the wireless signal received by the second antenna 142*c* may be transmitted to the communication circuit 141 through the transfer wire assembly 143*c*, the transfer element 143*b*, and the RF signal wires 1431 and 1432. In addition, the communication circuit 141 may transmit the power required by the second antenna 142*c* during operation through the power signal wire 1433, the transfer element 143*b*, and the transfer wire assembly 143*c*.

In detail, refer to FIG. 3. The transfer element 143*b* of this embodiment includes a power connection portion 1434, two RF connection portions 1435, and a transfer connection portion 1436. The power signal wire 1433 is connected to the power connection portion 1434, the RF signal wires 1431 and 1432 are connected to the two RF connection portions 1435, respectively, and the transfer wire assembly 143*c* is connected to the transfer connection portion 1436 and is electrically connected to the power signal wire 1433 and the RF signal wires 1431 and 1432 through the transfer element 143*b*. In some embodiments, the transfer wire assembly 143*c* may be, for example, a flexible circuit board, which may include a power transfer line and two RF transfer lines. The power transfer line is electrically connected to the power signal wire 1433 through the transfer element 143*b*, and the two RF transfer lines are also electrically connected to the RF signal wires 1431 and 1432 through the transfer element 143*b*, respectively.

Each of the RF signal wires 1431 and 1432 of this embodiment may be, for example, but not limited to, an IPEX MHF7 transmission line, and the transfer wire assembly 143*c* may be, for example, but not limited to, a liquid crystal polymer (LCP) flexible circuit board. A power loss per unit length of the IPEX MHF7 transmission line (about 0.6 dB loss per 100 mm) is less than a power loss per unit length of the LCP flexible circuit board (about 2.3 dB loss per 100 mm).

Therefore, through the design that the second antenna 142*c* is disposed at the top headband 13, one end of the connecting wire assembly 143*a* is connected to the communication circuit 141, the other end of the connecting wire assembly 143*a* is electrically connected to the second antenna 142*c* through the transfer element 143*b* and the transfer wire assembly 143*c*, and the power loss per unit length of the RF signal wires 1431 and 1432 is less than the power loss per unit length of the transfer wire assembly 143*c*, the attenuation of the RF signal of the second antenna 142*c* away from the communication circuit 141 can be reduced to meet the specification of 5G millimeter wave communication loss.

Refer to FIG. 2 and FIG. 3 again. The communication device of this embodiment may further include a first heat dissipation element 144. The first heat dissipation element 144 is disposed at the top headband 13, and the second antenna 142*c* and the transfer element 143*b* are disposed at two opposite sides of the first heat dissipation element 144, respectively. A surface of the second antenna 142*c* is attached to the first heat dissipation element 144, and the transfer element 143*b* is spaced apart from the first heat dissipation element 144 to form a heat dissipation space S (refer to FIG. 4). The first heat dissipation element 144 is made of a material with high thermal conductivity (for example, but not limited to silver, copper, gold, aluminum, or its alloy), and the second antenna 142*c* may be attached to the first heat dissipation element 144 with thermally conductive paste, for example, to dissipate waste heat generated by the second antenna 142*c* through the first heat dissipation element 144, thereby solving the problem that the second antenna 142*c* needs to dissipate heat.

The first heat dissipation element 144 of this embodiment has a bent portion 1441 facing the display unit 11 and a main body 1442 parallel to the top headband 13, and the second antenna 142*c* is disposed at the bent portion 1441 and the transfer element 143*b* is disposed at the main body 1442. Therefore, the second antenna 142*c* may have a radiating surface facing the display unit 11, and the transfer element 143*b* and the main body 1442 of the first heat dissipation element 144 can match the shape of the top headband 13 to maintain the overall aesthetics. The second antenna 142*c* and the transfer element 143*b* of this embodiment are disposed at two opposite sides of the first heat dissipation element 144, respectively. Herein, the first heat dissipation element 144 may further include a through hole H between the second antenna 142*c* and the transfer element 143*b* (FIG. 3), and the transfer wire assembly 143*c* extends through the through hole H and has two opposite ends connected to the second antenna 142*c* and the transfer element 143*b*, respectively.

It may be understood that, in the head-mounted display device 1 shown in FIG. 1 and FIG. 2, the elements such as the second antenna 142*c*, the first heat dissipation element 144, and the connecting wire assembly 143*a* which are disposed at the top headband 13 are exposed. The designer may cover the second antenna 142*c*, the first heat dissipation element 144, and the connecting wire assembly 143*a* with nonmetallic materials according to appearance requirements to achieve aesthetic effects.

In addition, the first antennas 142*a* and 142*b* of this embodiment are disposed at two opposite sides of the casing 12, respectively. Herein, the first antennas 142*a* and 142*b* are disposed in the casing 12, and the communication circuit 141 transmits an RF signal and power to each of the first antennas 142*a* and 142*b* through a transmission line (for example, but not limited to, the LCP flexible circuit board) for transmitting the RF signal and a power signal.

The head-mounted display device 1 of this embodiment may further include a second heat dissipation element 15. The second heat dissipation element 15 is disposed at the casing 12. The communication circuit 141 and the first antennas 142*a* and 142*b* are disposed at the second heat dissipation element 15. The second heat dissipation element 15 is made of a material with high thermal conductivity (for example, but not limited to silver, copper, gold, aluminum, or its alloy). The communication circuit 141 and the first antennas 142*a* and 142*b* may be, for example, attached to the second heat dissipation element 15 with thermally conductive paste. Therefore, the second heat dissipation element 15 may dissipate waste heat generated by the communication circuit 141 and the first antennas 142*a* and 142*b*, thereby solving the problem that the communication circuit 141 and the first antennas 142*a* and 142*b* need to dissipate heat. The second heat dissipation element 15 of this embodiment has two bent portions 151*a* and 151*b* located on two opposite sides (FIG. 2), and each of the first antennas 142*a* and 142*b* is correspondingly disposed at each of the bent portions 151*a* and 151*b*. Therefore, the two first antennas 142*a* and 142*b* may have radiating surfaces facing the left and right facing away from the casing 12, respectively.

In addition, the antenna assembly of this embodiment may further include at least one third antenna 142*d*. The third antenna 142*d* is disposed in the casing 12 and electrically connected to the communication circuit 141. The third antenna 142*d* may include, for example, a Sub-6 GHz antenna. Herein, the antenna assembly includes four full-band Sub-6 GHz antennas (four third antennas 142*d*) by way of example. In addition, the head-mounted display device 1 of this embodiment may further include a battery 16, and the battery 16 is disposed in the casing 12. The battery 16 is, for example, a lithium battery, which is configured to supply power required by an element disposed in the casing 12.

Figure 4:
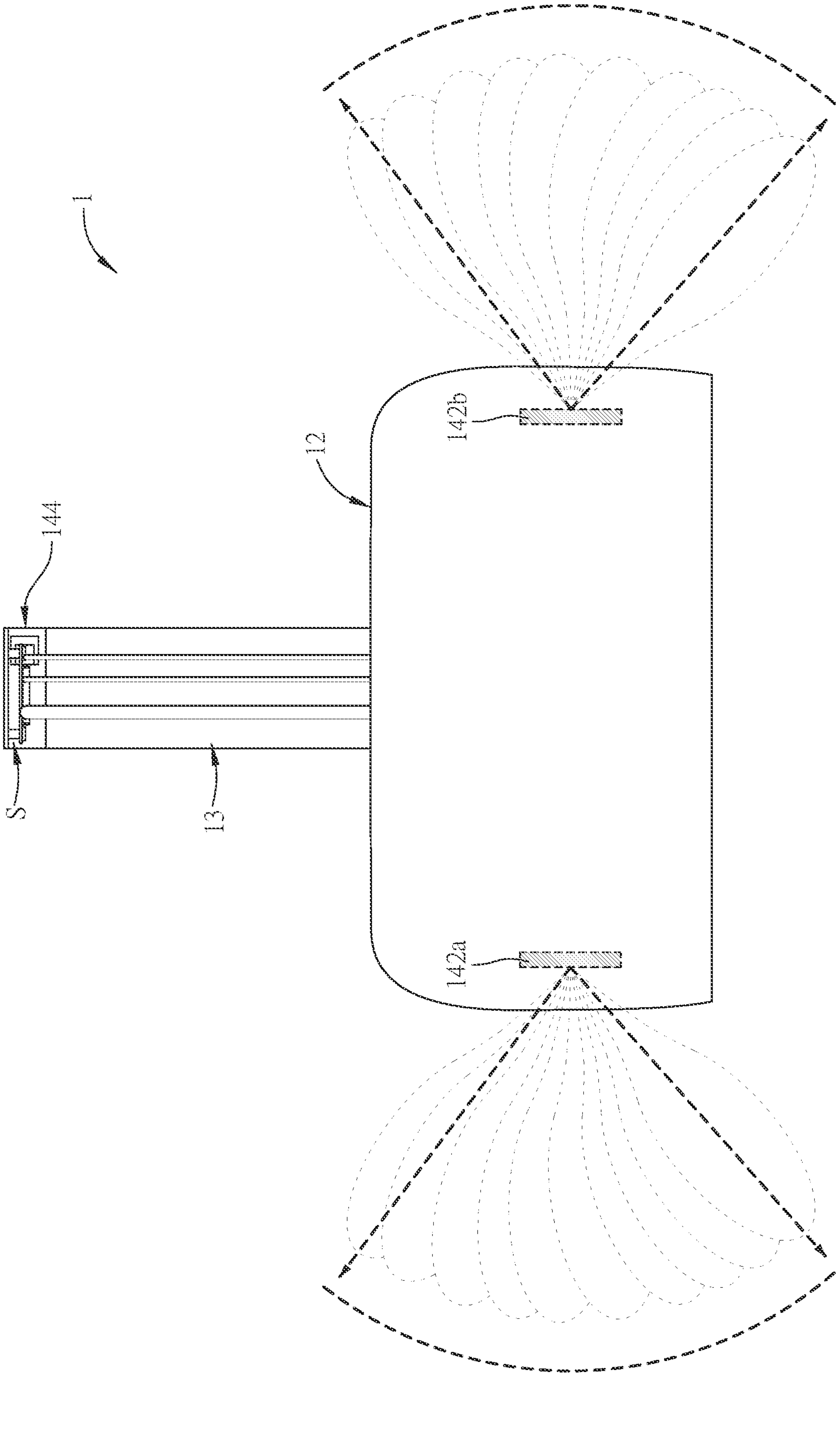
FIG. 4 and FIG. 5 are respectively schematic diagrams of antenna fields of the head-mounted display device of FIG. 1 from different perspectives.
Figure 5:
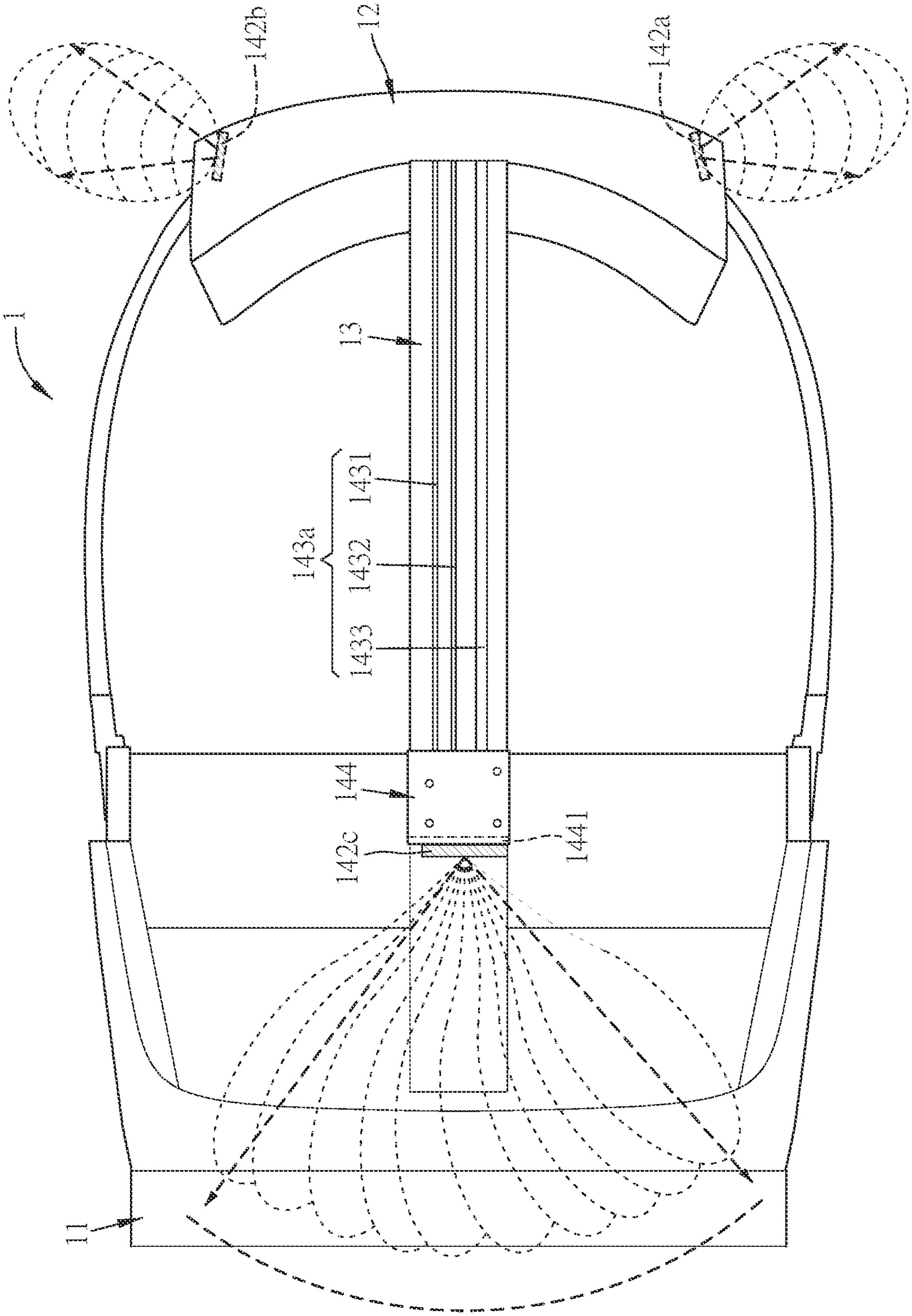

Referring to FIG. 4 and FIG. 5, FIG. 4 and FIG. 5 are respectively schematic diagrams of antenna fields of the head-mounted display device of FIG. 1 from different perspectives. FIG. 4 shows antenna fields of two first antennas 142*a* and 142*b* in a rear-view direction of the head-mounted display device 1, and FIG. 5 shows antenna patterns of two first antennas 142*a* and 142*b* and a second antenna 142*c* in a top-view direction of the head-mounted display device 1.

It may be learned from FIG. 4 and FIG. 5 that the second antenna 142*c* may be configured such that the second antenna 142*c* has the radiating surface facing the display unit 11, which, in addition to the radiating surfaces of the two first antennas 142*a* and 142*b* facing away from the casing 12, may increase a coverage of a 5G millimeter wave field, so that a 5G millimeter wave signal may reach a front side and both a left rear side and a right rear side of a head of a user.

Carrying on with the above, in the head-mounted display device 1 of this embodiment, the heat dissipation problem of the 5G millimeter wave antenna can be solved by disposing the second antenna 142*c* on the top headband 13 and the first heat dissipation element 144 equipped with the second antenna 142*c*. A distance between the second antenna 142*c* and the communication circuit 141 is reduced since the second antenna 142*c* is disposed at the top headband 13, and IPEX MHF7 transmission lines (RF signal wires 1431 and 1432) with relatively low RF signal loss and the LCP flexible circuit board (the transfer wire assembly 143*c*) with relatively high loss but capable of transmitting RF and power signals are also disposed. In this way, the effect of reducing RF signal loss is achieved, and the requirements of 5G millimeter wave RF signal loss can be satisfied. In addition, the configuration of the second antenna 142*c* may also increase the coverage of the 5G millimeter wave field, and with the two first antennas 142*a* and 142*b*, the user can receive the 5G millimeter wave signal on the front side and the back side of the head, so that the user can maintain the high-efficiency data transmission in all directions of the use situation, without a problem of poor communication due to a dead zone which is a result of a small signal coverage.

It is to be noted that the communication device of this embodiment can be applied to 5G millimeter-wave antennas made by different manufacturers through the transfer element 143*b* and the transfer wire assembly 143*c* of the transfer module 143. In addition, three 5G millimeter-wave antennas are configured in this embodiment by way of example, which is not limited thereto. In different embodiments, more 5G millimeter-wave antennas may also be configured to further increase the communication coverage, which is not limited to the three antennas in the above embodiment.

Based on the above, in the communication device and the head-mounted display device having the communication device of the present invention, through the design that two first antennas are disposed in the casing, the second antenna is disposed at the top headband, one end of the connecting wire assembly is connected to the communication circuit, the other end of the connecting wire assembly is electrically connected to the second antenna through the transfer element and the transfer wire assembly, and the power loss per unit length of the two RF signal wires is less than the power loss per unit length of the transfer wire assembly, the attenuation of the RF signal of the second antenna away from the communication circuit can be reduced to meet the specification of 5G millimeter wave communication loss, and high-efficiency data transmission can be maintained in all orientations, so as to avoid the problem of poor communication due to a dead zone which is a result of a small signal coverage. In addition, through the design of the transfer element and the transfer wire assembly in the present invention, the wire types of the RF signal wire and the power signal wire are not limited by the interface specification of the second antenna. Suitable wires may be selected for long-distance transmission and then converted into a transfer wire assembly conforming to the interface specification of the second antenna, so as to be applicable to 5G millimeter wave antennas made by different manufacturers, which greatly improves the design flexibility.

The above descriptions are merely preferred embodiments of the present invention. However, for a person skilled in the art, the embodiments are only used to describe the present invention, and are not intended to limit the present invention. It should be noted that all variations and substitutions equivalent to this embodiment should be considered to be included in the scope of the present invention. Therefore, the protection scope of the present invention shall be subject to those defined in the claims.

What is claimed is:

1. A communication device, adapted to be disposed in a head-mounted display device, wherein the head-mounted display device comprises a display unit, a casing, and a top headband, the display unit is connected to the casing through the top headband, and the communication device comprises:

a communication circuit, disposed at the casing;

an antenna assembly, comprising at least one first antenna and a second antenna, wherein the at least one first antenna is disposed at the casing and is electrically connected to the communication circuit, and the second antenna is disposed at the top headband;

a transfer module, comprising a connecting wire assembly, a transfer element, and a transfer wire assembly, wherein the transfer wire assembly is electrically connected to the transfer element and the second antenna, one end of the connecting wire assembly is connected to the communication circuit, the other end of the connecting wire assembly is connected to the transfer element to be electrically connected to the second antenna, the connecting wire assembly comprises two radio frequency (RF) signal wires and a power signal wire, and a power loss per unit length of the two RF signal wires is less than a power loss per unit length of the transfer wire assembly; and a first heat dissipation element, wherein the first heat dissipation element is disposed at the top headband, and the second antenna and the transfer element are disposed at the first heat dissipation element.

2. The communication device according to claim 1, wherein the transfer element comprises a power connection portion, two RF connection portions, and a transfer connection portion, the power signal wire is connected to the power connection portion, the two RF signal wires are connected to the two RF connection portions, respectively, and the transfer wire assembly is connected to the transfer connection portion.

3. The communication device according to claim 1, wherein the transfer wire assembly is a flexible circuit board and comprises a power transfer line and two RF transfer lines, the power transfer line is electrically connected to the power signal wire through the transfer element, and the two RF transfer lines are electrically connected to the two RF signal wires through the transfer element, respectively.

4. The communication device according to claim 1, wherein the first heat dissipation element has a bent portion facing the display unit, and the second antenna is disposed at the bent portion.

5. The communication device according to claim 4, wherein the first heat dissipation element further has a main body parallel to the top headband, and the transfer element is disposed at the main body.

6. The communication device according to claim 1, wherein the second antenna and the transfer element are disposed at two opposite sides of the first heat dissipation element, respectively, the first heat dissipation element comprises a through hole located between the second antenna and the transfer element, and the transfer wire assembly is passed through the through hole and has two opposite ends connected to the second antenna and the transfer element, respectively.

7. A head-mounted display device, comprising:

a display unit, a casing, and a top headband, wherein the display unit is connected to the casing through the top headband; and a communication device, comprising a communication circuit, disposed at the casing;

an antenna assembly, comprising at least one first antenna and a second antenna, wherein the at least one first antenna is disposed at the casing and is electrically connected to the communication circuit, and the second antenna is disposed at the top headband;

a transfer module, comprising a connecting wire assembly, a transfer element, and a transfer wire assembly, wherein the transfer wire assembly is electrically connected to the transfer element and the second antenna, one end of the connecting wire assembly is connected to the communication circuit, the other end of the connecting wire assembly is connected to the transfer element to be electrically connected to the second antenna, the connecting wire assembly comprises two radio frequency (RF) signal wires and a power signal wire, and a power loss per unit length of the two RF signal wires is less than a power loss per unit length of the transfer wire assembly; and a first heat dissipation element, wherein the first heat dissipation element is disposed at the top headband, and the second antenna and the transfer element are disposed at the first heat dissipation element.

8. The head-mounted display device according to claim 7, wherein the first heat dissipation element has a bent portion facing the display unit, and the second antenna is disposed at the bent portion.

9. The head-mounted display device according to claim 7, wherein the antenna assembly comprises two first antennas, and the two first antennas are disposed at two opposite sides of the casing, respectively.

10. The head-mounted display device according to claim 9, further comprising:

a second heat dissipation element, disposed at the casing, wherein the communication circuit and the two first antennas are disposed at the second heat dissipation element.

11. The head-mounted display device according to claim 10, wherein the second heat dissipation element has two bent portions located at two opposite sides, and each of the first antennas is correspondingly disposed at each of the bent portions.

* * * * *